United States Patent
Chen et al.

(10) Patent No.: US 10,087,322 B2
(45) Date of Patent: *Oct. 2, 2018

(54) FLUOROTHERMOPLASTIC POLYMER

(71) Applicant: 3M INNOVATIVE PROPERTIES COMPANY, St. Paul, MN (US)

(72) Inventors: Lisa P. Chen, St. Paul, MN (US); Klaus Hintzer, Kastl (DE); Harald Kaspar, Burgkirchen (DE); Kai H. Lochhaas, Neuotting (DE); Mark W. Muggli, Emmerting (DE); Jens Schrooten, Muehldorf am Inn (DE); Allen M. Sohlo, Lindstrom, MN (US); Helmut Traunspurger, Julbach (DE); Karl D. Weilandt, Afton, MN (US); Tilman C. Zipplies, Burghausen (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/503,109

(22) PCT Filed: Aug. 11, 2015

(86) PCT No.: PCT/US2015/044555
§ 371 (c)(1),
(2) Date: Feb. 10, 2017

(87) PCT Pub. No.: WO2016/028539
PCT Pub. Date: Feb. 25, 2016

(65) Prior Publication Data
US 2017/0226337 A1 Aug. 10, 2017

Related U.S. Application Data

(60) Provisional application No. 62/040,495, filed on Aug. 22, 2014.

(51) Int. Cl.
*C08F 214/16* (2006.01)
*C08F 214/22* (2006.01)
(Continued)

(52) U.S. Cl.
CPC .............. *C08L 27/18* (2013.01); *B32B 27/08* (2013.01); *B32B 27/20* (2013.01); *B32B 27/28* (2013.01);
(Continued)

(58) Field of Classification Search
None
See application file for complete search history.

(56) References Cited

U.S. PATENT DOCUMENTS

| 4,743,658 | A | 5/1988 | Imbalzano |
| 6,117,508 | A | 9/2000 | Parsonage |

(Continued)

FOREIGN PATENT DOCUMENTS

| CN | 102361892 | 2/2012 |
| EP | 0222945 | 5/1987 |

(Continued)

OTHER PUBLICATIONS

International Search Report for PCT International Application No. PCT/US2015/044555 dated Nov. 19, 2015, 5 pages.

*Primary Examiner* — Richard A Huhn
(74) *Attorney, Agent, or Firm* — Julie Lapos-Kuchar (57) ABSTRACT

Described herein is a composition comprising a fluorothermoplastic polymer, wherein the fluorothermoplastic polymer is derived from: (a) 60-85 mol % tetrafluoroethene; (b) 2-12 mol % hexafluoropropene; (c) 10-30 mol % vinylidene fluoride; (d) 0.2 to 5 mol % of a bromine-containing monomer. Such compositions can be used in multilayer constructions in, for example, fuel hose applications.

20 Claims, 1 Drawing Sheet

(51) Int. Cl.

| | |
|---|---|
| *C08F 214/26* | (2006.01) |
| *C08F 214/28* | (2006.01) |
| *C08L 27/18* | (2006.01) |
| *B32B 27/28* | (2006.01) |
| *B32B 27/20* | (2006.01) |
| *B32B 27/30* | (2006.01) |
| *B32B 27/32* | (2006.01) |
| *B32B 27/08* | (2006.01) |

(52) U.S. Cl.
CPC .......... *B32B 27/304* (2013.01); *B32B 27/308* (2013.01); *B32B 27/322* (2013.01); *C08F 214/26* (2013.01); *C08F 214/16* (2013.01); *C08F 214/22* (2013.01); *C08F 214/222* (2013.01); *C08F 214/262* (2013.01); *C08F 214/28* (2013.01); *C08F 214/282* (2013.01)

(56) References Cited

U.S. PATENT DOCUMENTS

| | | |
|---|---|---|
| 6,242,548 B1 | 6/2001 | Duchesne |
| 6,310,141 B1 | 10/2001 | Chen et al. |
| 6,429,258 B1 | 8/2002 | Morgan |
| 6,541,588 B1 | 4/2003 | Kaulbach |
| 6,583,226 B1 | 6/2003 | Kaulbach |
| 6,686,426 B2 | 2/2004 | Kaulbach |
| 6,849,314 B2 | 2/2005 | Jing |
| 6,864,336 B2 | 3/2005 | Kaspar |
| RE40,902 E | 9/2009 | Kaulbach |
| 7,671,112 B2 | 3/2010 | Hintzer |
| 8,997,797 B2 | 4/2015 | Kitahara et al. |
| 9,725,534 B2 | 8/2017 | Kitahara et al. |
| 2002/0028886 A1 | 3/2002 | Abe |
| 2003/0198770 A1* | 10/2003 | Fukushi .................. B32B 1/08 428/36.91 |
| 2007/0015937 A1 | 1/2007 | Hintzer |
| 2007/0208137 A1 | 9/2007 | Kaspar |
| 2011/0040021 A1 | 2/2011 | Kaspar |
| 2012/0129982 A1* | 5/2012 | Zipplies .................. C08F 14/18 524/58 |
| 2013/0109790 A1* | 5/2013 | Fukushi ............... C09D 127/12 524/84 |

FOREIGN PATENT DOCUMENTS

| | | |
|---|---|---|
| EP | 0992518 | 4/2000 |
| EP | 1741732 | 1/2007 |
| EP | 2077285 | 7/2009 |
| EP | 2284200 | 2/2011 |
| EP | 2412735 | 2/2012 |
| JP | 5222084 | 2/1977 |
| WO | WO 2002-44265 | 6/2002 |
| WO | WO 2002-088207 | 11/2002 |
| WO | WO 2003-028995 | 4/2003 |
| WO | WO 2004-024786 | 3/2004 |
| WO | WO 2009-009361 | 1/2009 |
| WO | WO 2014-088804 | 6/2014 |
| WO | WO 2014-088820 | 6/2014 |
| WO | WO 2016-028582 | 2/2016 |

* cited by examiner

FLUOROTHERMOPLASTIC POLYMER

CROSS REFERENCE TO RELATED APPLICATIONS

This application is a national stage filing under 35 U.S.C. 371 of PCT/US2015/044555, filed Aug.11, 2015, which claims the benefit of U.S. Application No. 62/040495, filed Aug. 22, 2014, the disclosure of which is incorporated by reference in its/their entirety herein.

TECHNICAL FIELD

A fluorothermoplastic polymer composition is described along with multilayer articles therefrom and a method of making the composition. The fluorothermoplastic polymer has good adhesion characteristics and/or low permeability to gasoline.

BACKGROUND

Growing environmental awareness has led to interest in controlling fuel volatility, which has raised the need in the automotive industry for materials having good fuel-barrier properties. Common rubber hoses for fuel transfer are laminate hoses comprising an elastomer (or rubber) and a barrier layer made of a fluoropolymer for enhancing the fuel permeability resistance. Interest and demand for a reduction in environmental loads has raised the need for lower fuel permeability of the barrier layer. The thickness of the barrier layer has been increased and various fluoropolymers have been considered to ensure lower release of fuel vapors. However, the increase in the barrier layer thickness leads to an increase in the hose weight and is disadvantageous from a cost standpoint. Additionally, bendability (flexibility) of the hose is lowered, which is disadvantageous in terms of handleability and assembly. In the case of the fluoropolymers, perfluorinated (fully fluorinated) polymers have been considered because they have low fuel permeability values. However, when perfluorinated polymers are used as a barrier layer, the barrier layer is not easily adhered to the other polymer layers of a multilayer article (e.g., hose). Thus, additional steps such as a surface treatment of the fluoropolymer for improving the adhesiveness, the use of tie layers, and/or winding a film or tape around the fluoropolymer layer can be used. These additional steps lower the productivity and also increase the cost of the finished good, which are disadvantageous.

SUMMARY

There is a desire to identify a fluorothermoplastic polymer showing low fuel permeation and/or good adhesion characteristics so that it can be utilized, for example, in multilayer laminate constructions.

In one aspect, a composition is provided comprising a fluorothermoplastic polymer, wherein the fluorothermoplastic polymer is derived from:
(a) 60-85 mol % tetrafluoroethene;
(b) 2-12 mol % hexafluoropropene;
(c) 10-30 mol % vinylidene fluoride; and
(d) 0.2 to 5 mol % of a bromine-containing monomer.

In another aspect, a multilayer article is provided comprising:
(i) a first polymer layer comprising a fluorothermoplastic polymer derived from:
(a) 60-85 mol % tetrafluoroethene;
(b) 2-12 mol % hexafluoropropene;
(c) 10-30 mol % vinylidene fluoride; and
(d) 0.2 to 5 mol % of a bromine-containing monomer; and
(ii) a second polymer layer wherein the second polymer layer is an elastomer
wherein the first polymer layer is in intimate contact with the second polymer layer.

In yet another aspect, a method of making the composition is provided comprising, polymerizing (a) 60-85 mol % tetrafluoroethene;
(b) 2-12 mol % hexafluoropropene;
(c) 10-30 mol % vinylidene fluoride; and
(d) 0.2 to 5 mol % of a bromine-containing monomer in the presence of an initiator.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

In the accompanying drawing.

DETAILED DESCRIPTION

As used herein, the term
"copolymer" refers to a polymer comprising repeating units derived from the recited monomers (comonomers) without excluding the option of other repeating units being present that derive from other monomers not explicitly recited;

"monomer" is a molecule which can undergo polymerization which then forms part of the essential structure of a polymer; and "polymer" refers to a macrostructure having a number average molecular weight ($M_n$) of at least 50,000 dalton, at least 100,000 dalton, at least 300,000 dalton, at least 500,000 dalton, at least 750,000 dalton, at least 1,000,000 dalton, or even at least 1,500,000 dalton and not such a high molecular weight that it inhibits melt-processing of the polymer.

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present application is directed toward a novel fluorothermoplastic polymer comprising a THV (tetrafluoroethene-hexafluoropropene-vinylidene fluoride) copolymer having enhanced bonding. Typically in fluorinated plastics, there is a tradeoff between low fuel permeation and adhesion as measured by peel strength. For example, increasing the TFE content of the polymer increases the permeation resistance to fuel, however this results in greater challenges in achieving a high level of adhesion to other substrates. It has been discovered that adding a bromine-containing monomer during the polymerization of the fluorothermoplastic polymer, results in a fluoropolymer that has good adhesion to other materials, while also having low fuel permeation, making these fluorothermoplastic polymers especially useful in hose applications.

Fluorothermoplastic Polymer

The thermoplastics of the present disclosure are partially fluorinated, meaning that they comprise both at least one carbon-fluorine bond and at least one carbon-hydrogen bond in the polymer backbone. The fluorothermoplastic polymer of the present disclosure comprises:

(a) at least 60, 65, 68, 70, or even 75 mol %; and no more than 85, 84, 82, or even 80 mol % of tetrafluoroethene based on the total moles of monomer used;

(b) at least 2, 3, 4, 6, or even 8 mol %; and no more than 12, 11, or even 10 mol % of hexafluoropropene based on the total moles of monomer used;

(c) at least 10, 12, 14, 16, 18, or even 20 mol %; and no more than 30, 28, 26, or even 24 mol % of vinylidene fluoride based on the total moles of monomer used;

(d) at least 0.2, 0.3, 0.4, 0.6, 0.8, or even 1 mol %; and no more than 5, 4.5, 4, 3.5, 3, 2.5, or even 2 mol % of a bromine-containing monomer based on the total moles of monomer used; and (e) optionally, at least 0.1, 0.2, 0.3, 0.4, 0.5 or even 0.6 mol %; and no more than 5, 4, 3.8, 3.7, 3.6, or even 3.5 mol % of a fluorinated allyl and/or vinyl ether monomer based on the total moles of monomer used.

The bromine-containing monomer may be fluorinated (partially fluorinated or fully fluorinated) or non-fluorinated. The bromine-containing monomers disclosed herein correspond to the general formula:

$$X_1X_2C=CX_3-(CY_1Y_2)_n(-O)_m-(O-CF(CF_3)-CF_2)_o-[O-(CF_2)_z]_r-(CX_4Br)_p-(CF_2)_q-Z$$

wherein $X_1$, $X_2$, $X_3$, $X_4$, $Y_1$, and $Y_2$ are independently selected from H, F, and $CF_3$; Z represents Br or F; n, o, p, and r are independently 0, 1, 2, or 3; m is 0 or 1; q is 0, 1, 2, 3, 4, or 5; z is 0, 1, 2, 3, 4, or 5. Exemplary bromine-containing monomers include: $F_2C=CHBr$ (BDFE), $F_2C=CFBr$ (BTFE), $H_2C=CH-CF_2-CF_2-Br$ (BTFB), $H_2C=CH-CF_2-Br$, $F_2C=CF-O-(CF_2)_{2-5}-Br$, $F_2C=CF-O-CF(CF_3)-CF_2-O-(CF_2)_{2-5}-Br$, $F_2C=CF-CF_2-O-(CF_2)_{2-5}-Br$, $H_2C=CH-CH_2-Br$, $F_2C=CF-O-CF_2-CFBr-CF_3$, and combinations thereof.

These bromine-containing monomers disclosed above are sometimes referred to as cure-site monomers, which are added to elastomeric compositions to provide sites for subsequent crosslinking. Fluoropolymers that are amorphous do not have a distinct and detectable melting point. They are typically used to make fluoroelastomers by curing or vulcanizing the fluoropolymer. Therefore, the amorphous polymers may contain cure-sites which can react to form a three dimensional cross-linking network. The elastomeric properties generally are obtained after curing. When making an elastomer, the polymerized elastomeric gum (coagulated polymer) containing the incorporated cure site monomers, is subjected to a crosslinking step involving a cure system (e.g, peroxide, bisphenol, etc.) which results in the linking of polymer chains and the formation of the elastomer. In the present disclosure, the resulting fluorothermoplastic does not comprise a subsequent crosslinking step. Surprisingly, it has been found that by incorporating these bromine-containing monomers to a fluorothermoplastic composition, the improved adhesion is realized.

Polymerization

In the present disclosure, the monomers are polymerized together using techniques known in the art to form the fluorothermoplastic polymer. In addition to the monomers disclosed above, additional monomers may be used so long as the spirit of the present invention is not compromised.

Additional monomers include, for example fluorovinyl ether monomers and fluoroallyl ether monomers such as perfluoro (methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), perfluoro(methoxymethyl vinyl ether) ($CF_3-O-CF_2-O-CF=CF_2$), and $CF_3-(CF_2)_2-O-CF(CF_3)-CF_2-O-CF=CF_2$, perfluoro(methyl allyl ether) ($CF_2=CF-CF_2-O-CF_3$), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), perfluoro(methoxymethyl allyl ether), and $CF_3-(CF_2)_2-O-CF(CF_3)-CF_2-O-CF(CF_3)-CF_2-O-CF_2-CF=CF_2$, and combinations thereof.

Known aqueous polymerization techniques including emulsion polymerization (wherein that polymerization occurs in polymer particles dispersed in water which may be electrostatically stabilized) may be used.

The reactor vessel for use in the polymerization process of the present disclosure is typically a pressurizable vessel capable of withstanding the internal pressures during the polymerization reaction. Typically, the reaction vessel will include a mechanical agitator, which will produce thorough mixing of the reactor contents and a heat exchange system. Any quantity of the monomers may be charged to the reactor vessel. The monomers may be charged batch-wise or in a continuous or semi-continuous manner. By semi-continuous is meant that a plurality of batches of the monomer are charged to the vessel during the course of the polymerization. The independent rate at which the monomers are added to the kettle will depend on the consumption rate of the particular monomer with time. Preferably, the rate of addition of monomer will equal the rate of consumption of monomer, that is conversion of monomer to polymer.

The reaction kettle is charged with water, the amounts of which are not critical. To the aqueous phase there is generally also added a surfactant, typically a non-telogenic fluorinated surfactant although aqueous emulsion polymerization without the addition of fluorinated surfactant or non-fluorinated surfactant may also be practiced. Suitable fluorinated surfactants include any fluorinated surfactant commonly employed in aqueous emulsion polymerization.

In one embodiment, a fluorinated surfactant may be used which corresponds to the general formula:

$$Y-R_f-Z-M$$

wherein Y represents hydrogen, Cl or F; $R_f$ represents a linear or branched perfluorinated alkylene having 4 to 10 carbon atoms; Z represents $COO^-$ or $SO_3^-$ and M represents a hydrogen ion, an alkali metal ion or an ammonium ion. Such fluorinated surfactants include fluorinated alkanoic acid and fluorinated alkanoic sulphonic acids and salts thereof, such as ammonium salts of perfluorooctanoic acid and perfluorooctane sulphonic acid. Also contemplated for use in the preparation of the polymers described herein are fluorinated surfactants of the general formula:

$$[R_f-O-L-COO-]_i X^{i+}$$

wherein L represents a linear or branched partially or fully fluorinated alkylene group or an aliphatic hydrocarbon group, $R_f$ represents a linear or branched partially or fully fluorinated aliphatic group or a linear or branched partially or fully fluorinated group interrupted with one or more oxygen atoms, $X^{i+}$ represents a cation having the valence i and i is 1, 2 or 3. In one embodiment, the emulsifier is selected from $CF_3$—O—$(CF_2)_3$—O—CHF—$CF_2$—COOH and salts thereof. Specific examples are described in US 2007/0015937, which is incorporated herein by reference. Exemplary emulsifiers include: $CF_3CF_2OCF_2CF_2OCF_2COOH$, $CHF_2(CF_2)_5COOH$, $CF_3(CF_2)_6COOH$, $CF_3O(CF_2)_3OCF(CF_3)COOH$, $CF_3CF_2CH_2OCF_2CH_2OCF_2COOH$, $CF_3O(CF_2)_3OCHFCF_2COOH$, $CF_3O(CF_2)_3OCF_2COOH$, $CF_3(CF_2)_3(CH_2CF_2)_2CF_2CF_2CF_2COOH$, $CF_3(CF_2)_2CH_2(CF_2)_2COOH$, $CF_3(CF_2)_2COOH$, $CF_3(CF_2)_2OCF(CF_3)CF_2OCF(CF_3)COOH$, $CF_3(CF_2)_2(OCF_2CF_2)_4OCF(CF_3)COOH$, $CF_3OCF_2CF(CF_3)OCF(CF_3)COOH$, $C_3F_7OCF(CF_3)COOH$, $CF_3CF_2O(CF_2CF_2O)_3CF_2COOH$, and their salts.

Also contemplated for use in the preparation of the polymers described herein are fluorinated polyether surfactants, such as described in U.S. Pat. No. 6,429,258.

In yet another embodiment, polymerizable fluorinated emulsifiers (also referred to as surfmer) according to the following formula can be used in the preparation of the polymers described herein where X is independently selected from H, F, or $CF_3$; Y is COOM or $SO_3M$; wherein the polymerizable fluorinated emulsifier comprises at least 1 fluorine atom. M is H, an alkali metal (e.g., Na, Ca, etc.), or $NH_4$. Subscript m is 0-6, 0-5, 0-4, 0-3, or even 0-2. Subscript n is 0-6, 0-5, 0-4, 0-3, or even 0-2. Subscript p is at least 1, 2, 3, 4, or even 5; and no more than 20, 10, 8, or even 6. Subscript q is 0-6, 0-5, 0-4, 0-3, or even 0-2. Subscript r is 0-6, 0-5, 0-4, 0-3, or even 0-2. Subscript s is 0-6, 0-5, 0-4, 0-3, or even 0-2. Subscript t is 0-6, 0-5, 0-4, 0-3, or even 0-2. Subscript u is 0-6, 0-5, 0-4, 0-3, or even 0-2. Subscript v is 0-6, 0-5, 0-4, 0-3, or even 0-2. Subscript w is 0 or 1. Subscript z is 0-6, 0-5, 0-4, 0-3, or even 0-2. At least one of m, n, q, s, t, u, v, and z is at least 1. These fluorinated emulsifiers are able to be polymerized into the polymer during the polymerization.

Exemplary emulsifiers include fluorinated allyl and vinyl ethers including: $CF_2$=CF—$(CF_2)_m$—O—$(CF_2)_p$—O—$(CF_2)_r$—Y; $CF_2$=CF—$(CF_2)_m$—O—$(CF_2)_p$—$CH_2$—Y; $CF_2CF$=$(CF_2)_m$—O—$(CF_2)_p$—(O—$CF(CF_3)$—$CF_2)^t$—O—$CF(CF_3)$—Y; $CF_2$=CF—$(CF_2)_m$—O—$(CF_2)_p$—O—CHF—$CF_2$—Y; and $CF_2$=CF—$(CF_2)_m$—O—$(CF_2)_p$—O—CHF—Y. where Y is COOM or $SO_3M$. M is H, an alkali metal, or $NH_4$. Subscript m is an integer from 0-6. Subscript r is an integer from 0-6. Subscript t is an integer from 0-6. Subscript p is an integer from 1-6. Exemplary emulsifiers also include fluorinated olefins such as:

where X is independently selected from H, F, or $CF_3$ and Y is COOM or $SO_3M$. M is H, an alkali metal, or $NH_4$. Subscript m is an integer from 1-6. In one embodiment, at least one of X in the fluorinated olefin is an H. In one embodiment, at least one of X in the fluorinated olefin contains an F atom. These emulsifiers are described in U.S. patent application Nos. 61/732,966 and 61/732,967, filed Dec. 4, 2012, herein incorporated by reference.

These fluorinated surfactants may be used alone or in combination as a mixture of two or more of them. The amount of the surfactant is generally within a range of 250 to 5,000 ppm (parts per million), preferably 250 to 2000 ppm, more preferably 300 to 1000 ppm, based on the mass of water to be used.

In one embodiment, the polymerization is substantially free of a fluorinated emulsifier comprising an acid or salt like fluorinated alkanoic acids or salts thereof; fluorinated alkanoic sulphonic acids or salts thereof; fluorinated mono- or dioxaalkanoic acids or salts thereof; or combinations thereof. Such a polymerization may be conducted by means of fluoropolymer seed particles as known in the art. As used here, substantially free of an emulsifier, means less than 0.1%, 0.05%, 0.01%, or even 0.001% by weight of the emulsifier versus the total weight of the dispersion is present, or even no emulsifier is detected in the resulting dispersion.

In one embodiment, a chain-transfer agent may be used to control the molecular weight of the fluoropolymer so as to obtain the desired zero shear rate viscosity and/or to introduce halogen atoms (I or Br) at a terminal position of the polymer chain. Examples of chain-transfer agents include those selected from the group consisting of chlorine-, bromine-, and iodine-containing compounds, alcohols such as isopropyl alcohol, mercaptans such as isooctyl thioglycolate and carbon tetrabromide, amines, alkanes such as ethane or n-pentane, dialkyl ethers such as dimethyl ether, methyl tertiary-butyl ether and mixtures thereof. Exemplary suitable chain-transfer agents include those having the formula $R_fP_x$, wherein P is Br or I, preferably Br, $R_f$ is an x-valent alkyl radical having from 1 to 12 carbon atoms, which optionally may also contain chlorine atoms. Typically, x is 1 or 2. Useful chain-transfer agents include perfluorinated alkyl monoiodide, perfluorinated alkylene diiodide, perfluorinated alkyl monobromide, perfluorinated alkylene dibromide, perfluorinated alkylene monobromide monoiodide, and combinations thereof. Specific examples include $CF_2Br_2$, $Br(CF_2)_2Br$, $Br(CF_2)_4Br$, $CF_2ClBr$, $CF_3CFBrCF_2Br$, $BrCF_2CFBrOR_f$ wherein $R_f$ represents a linear or branched partially or fully fluorinated aliphatic group or a linear or branched partially or fully fluorinated group interrupted with one or more oxygen atoms, $I(CF_2)_nI$ wherein n is an integer from 1-10, $Br(CF_2)_nI$ wherein n is an integer from 1-10 (e.g., $Br(CF_2)_2I$), and combinations thereof. In one embodiment, perfluorinated alkyl dibromides are used.

The polymerization is usually initiated after an initial charge of monomer by adding an initiator or initiator system to the aqueous phase. For example, peroxides can be used as free radical initiators. Specific examples of peroxide initiators include hydrogen peroxide, diacyl peroxides such as diacetyl peroxide, dipropionyl peroxide, dibutyryl peroxide, dibenzoyl peroxide, benzoylacetyl peroxide, diglutaric acid peroxide and dilauryl peroxide, and further water-soluble per-acids and water-soluble salts thereof such as for example ammonium, sodium or potassium salts. Examples of per-acids include peracetic acid, sodium peroxodisulfate, potassium peroxodisulfate or ammonium peroxodisulfate. Esters of the per-acid can be used as well and examples thereof include tertiary-butyl peroxyacetate and tertiary-butyl peroxypivalate. A further class of initiators that can be used are water-soluble azo-compounds. Suitable redox systems for use as initiators include for example a combination of peroxodisulfate and hydrogen sulphite or disulphite, a combination of thiosulfate and peroxodisulfate or a combination of peroxodisulfate and hydrazine. Alkali or earth alkali metal hydroxymethanesulfinates may be used in redox systems as well. Further initiators that can be used are ammonium-, alkali- or earth alkali salts of persulfates, permanganic or manganic acids. The amount of initiator employed is typically between 0.001 and 2% by weight, preferably between 0.005 and 1% by weight based on the total weight of the polymerization mixture. The full amount of initiator may be added at the start of the polymerization or the initiator can be added to the polymerization in a continuous way during the polymerization until a conversion of 70 to 80%. One can also add part of the initiator at the start and the remainder in one or separate additional portions during the polymerization. Accelerators such as for example water-soluble salts of iron, copper, and silver may also be added.

During the initiation of the polymerization reaction, the sealed reactor kettle and its contents are conveniently preheated to the reaction temperature. Polymerization temperatures may be from 20° C., from 30° C., or even from 40° C. and may further be up to 100° C., up to 110° C., or even up to 150° C. The polymerization pressure may range, for instance, from 4 to 30 bar, in particular from 8 to 20 bar. The aqueous emulsion polymerization system may further comprise auxiliaries, such as buffers and complex-formers.

In one embodiment, a co-solvent may be used. Co-solvents are usually fluorinated organic liquids with boiling points of at least 30° C. In one embodiment, the polymerization is conducted in the absence of an organic solvent.

The amount of polymer solids that can be obtained at the end of the polymerization is typically at least 10% by weight, or even at least 20% by weight, and up to 40% by weight, and even up to 45% by weight; and the average particle size (diameter) of the resulting fluoropolymer is typically between 30 nm and 500 nm, preferably between 55 nm to 250 nm.

In one embodiment, the resulting dispersion comprising the fluoropolymer is substantially free of a non-aqueous solvent, meaning that less than 1% is present by weight based on the total weight of the dispersion.

In one embodiment, the resulting dispersion comprising the fluoropolymer is substantially free of a solvent, meaning that less than 1% is present by weight based on the total weight of the dispersion.

In one embodiment, the resulting dispersion comprising the fluoropolymer is substantially free of a fluorinated emulsifier, meaning that less than 0.1%, 0.05%, 0.01%, or even 0.001% or even none is present by weight of a fluorinated emulsifier based on the total weight of the dispersion.

Properties

The fluoropolymer of the present disclosure is a thermoplastic polymer, meaning it is an at least partially crystalline polymer that exhibits a melting point.

The fluorothermoplastic polymer of the present disclosure has a melting point of at least 150° C., 175° C., 200° C., or even at least 225° C. and typically no more than 290° C. The melting point is preferred to be between 225° C. and 280° C.

In one embodiment, the fluorothermoplastic polymer of the present disclosure with a melting point in the range of 150-250° C. has a melt flow rate (MFR) of 1 to 100 g/10 min or even between 3 and 50 g/10 min at 297° C. with a 5 kilogram (kg) load. In another embodiment, the fluorothermoplastic polymer of the present disclosure with a melting point above 250° C. has an MFR of 1 to 100 g/10 min or even between 3 and 50 g/10 min at 372° C. with a 5 kg load.

In one embodiment, the fluorothermoplastic polymer of the present disclosure is linear showing a relaxation exponent, described in U.S. Pat. Publ. Nos. 2011/0040021 and 2007/0208137, of n≥0.93. Alternatively, in one embodiment, the fluorothermoplastic polymer comprising branching has a relaxation exponent of n<0.93.

To increase the level of branching and, thus, to reduce the relaxation exponent, one or more fluorinated, preferably perfluorinated, bisolefinic ethers selected from diallyl ethers, divinyl ethers and allyl vinyl ethers may be used as an additional comonomer. Generally, these comonomers are of the general formula (I), (II), or (III)

wherein $R_1$, $R_2$, $R_3$ and $R_4$ are independently from each other F, H, alkyl, alkoxy, polyoxaalkyl, perfluoroalkyl, perfluoroalkoxy or perfluoropolyoxaalkyl; Preferably, $R_1$, $R_2$, $R_3$, and $R_4$ are, independently from each other, F, $CF_3$, $C_2F_5$, $C_3F_7$, $C_4F_9$, H, $CH_3$, $C_2H_5$, $C_3H_7$, $C_4H_9$, preferably F.

$Rf_1$ represents a residue selected from linear or branched perfluoroalkanediyl, perfluorooxaalkanediyl or perfluoropolyoxaalkanediyl residues or a residue according to $Rf_2$. Preferably, $Rf_1$ contains from 1 to 12, more preferably, from 1 to 10 carbon atoms, more preferably $Rf_1$ is a perfluoroalkanediyl residue having from 1 to 12, or from 2 to 10 or from 3 to 8 carbon atoms.

$Rf_2$ is a non-fluorinated, a fluorinated or a perfluorinated arylene. The arylene may be non-substituted or substituted with one or more halogen atoms other than F, perfluorinated alkyl residues, perfluorinated alkoxy residues, perfluorinated oxaalkyl residues, perfluorinated polyoxaalkyl residues, fluorinated, perfluorinated or non-fluorinated phenyl or phenoxy moieties or combinations thereof, wherein the phenyl or phenoxy residues may be non-substituted or substituted with one or more perfluorinated alkyl, alkoxy, oxaalkyl or polyoxaalkyl residue or one or more halogen atoms other than F or combinations thereof. Preferably, $Rf_2$ contains from 1 to 14 carbon atoms, more preferably from 1 to 12, most preferably from 1 to 10 carbon atoms.

Preferably, the comonomers are perfluorinated. More preferably, the comonomers are perfluorinated and aliphatic.

Examples of bisolefinic ethers according to formula (I) include but are not limited to:

Examples of bisolefinic ethers according to formula (II) include but are not limited to:

Typical examples of $Rf_1$ include but are not limited to: $CF_2$, $(CF_2)_n$ with n being 2, 3, 4, 5, 6, 7 or 8, $CF_2$—O—$CF_2$, $CF_2$—O—$CF_2$—$CF_2$, $CF(CF_3)$, $(CF_2)_2$—O—$CF(CF_3)$—$CF_2$, $CF(CF_3)$—$CF_2$—O—$CF(CF_3)$,
and
$(CF_2)_2$—O—$CF(CF_3)$—$CF_2$—O—$CF(CF_3)$—$CF_2$—O—$CF_2$.

Typical examples of $Rf_2$ include but are not limited to phenylene, mono-, di-, tri- or tetrafluoro-phenylene residues with the olefinic residues being linked via the ortho, para or meta position. Other typical examples of $Rf_2$ include fluorinated, perfluorinated or non-fluorinated phenoxyphenylene residues or fluorinated, non-fluorinated or perfluorinated (1,1-bis(trifluoromethyl)benzyl)phenylene residues. These residues may also be substituted. Typical substituents include non-fluorinated, fluorinated or perfluorinated phenyl or phenoxy residues or perfluorinated alkyl (e.g. —$CF_3$, —$CF_2CF_3$ etc groups) or perfluorinated alkoxy (e.g. —O—

CF$_3$, —O—CF$_2$—CF$_3$) or polyoxaalkyl or polyoxaalkoxy groups (e.g. —O—CF$_2$—O—CF$_3$, —CF$_2$—O—CF$_2$—O—CF$_3$ etc groups).

In one embodiment, the fluorothermoplastic polymers of the present disclosure have a permeation constant at 60° C. with CE10 fuel of less than 4, 3.5, 3, 2.5, 2.2, 2.0, 1.8, or even 1.6 g mm d$^{-1}$·m$^{-2}$ when measured as described in the Permeation Testing described in the Example Section. The fuel permeation constant is obtained by the following procedures. Namely, a sheet made of the fluorothermoplastic polymer is placed in a cup for the fuel permeation measurement containing a mixed solvent of CE10 fuel, which is Fuel C as specified in ASTM D471-12a blended with ethanol, such that the blend has 10.0±1.0% ethanol by volume (in other words a volume ratio of 45% isooctane, 45% toluene and 10% ethanol). The mass change was measured at 60° C. Based on the measured value, the fuel permeation constant is calculated.

Articles

Figure 1:
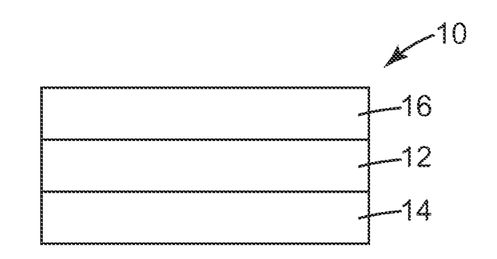
FIG. 1 is a cross-sectional view of multilayer article 10.

The fluorothermoplastic polymers of the present disclosure can be contacted with another material to form multilayer articles, such as that disclosed in FIG. 1, where 10 is a multilayer article comprising a first polymer layer 12, which is a fluorothermoplastic polymer and a second polymer layer 14, which is an elastomer. Optional additional polymer layer 16 is shown in FIG. 1 as being contacted with first polymer layer 12, however, the additional polymer layer may alternatively be in contact with second polymer layer 14. Furthermore, the same or different additional polymer layers may be adhered to both the first polymer layer and the second polymer layer.

The second polymer layer is an elastomer, which can be natural or synthetic. The elastomer may be fluorinated (comprising fluorine atoms) or non-fluorinated.

Fluorine-free elastomers include, for example, diene rubbers such as acrylonitrile-butadiene rubber (NBR) and its hydride (HNBR), styrene-butadiene rubber (SBR), chloroprene rubber (CR), butadiene rubber (BR), natural rubber (NR), and isoprene rubber (IR); ethene-propene-termonomer copolymer rubber, silicone rubber, butyl rubber, epichlorohydrin rubber, and acrylic rubbers.

Fluorinated elastomers include those known in the art, for example, copolymers comprising TFE, HFP, VDF and peroxide-curable perfluoroelastomers.

In the present disclosure, the fluorothermoplastic polymer comprises pendent bromine groups which improve the adhesion of the fluorothermoplastic layer with the elastomer layer. Although not wanting to be limited by theory, it is believed that these bromine groups are reactive enough to provide sites of bonding when adhering the fluorothermoplastic to a second polymer layer. Further, these bromine groups are stable enough to not be labile during the high temperatures used during, for example, plastic lamination.

In one embodiment, the first polymer layer is intimately contacted with the second polymer layer in the absence of an adhesive (or tie) layer such that the bonding interface between the first polymer layer and the second polymer layer consists essentially of a first material having the composition of the first polymer layer and a second material having the composition of the second polymer layer.

In another embodiment, the first polymer layer is intimately contacted with the second polymer layer in the presence of an adhesive (or tie) layer. Such adhesives are known in the art and include, for example, elastomers, such as a silicone elastomer, and fluoropolymers comprising TFE, HFP and VDF.

In one embodiment, the first polymer layer and the second polymer layer have an average peel strength when measured via a T-peel test in accordance to ASTM D-1876-08 using an Instron Model 5564 test machine with a crosshead speed of 300 mm/min of more than 4, 6, 10, 15, or even 20 lbs/in (pounds per inch) (700, 1050, 1751, 2627, or even 3503 Newton/meter).

As is known in the art, additives (such as antioxidants, fillers, etc.) can be added to the various polymer layers to improve, for example, their manufacture and/or final properties.

In one embodiment, an adhesion promoter may be added to the second polymer layer to improve the adhesion between the fluoropolymer layer and the elastomer. Exemplary adhesion promoters include: 1,8-diazabicyclo(5.4.0) undec-7-ene salt (DBU salt), a 1,5-diazabicyclo(4.3.0)-non-5-ene salt (DBN salt), 1,8-diazabicyclo(5.4.0)undec-7-ene (DBU), and 1,5-diazabicyclo(4.3.0)-non-5-ene (DBN).

Examples of the DBU salt and the DBN salt include a carbonate, a long chain aliphatic carboxylate, an aromatic carboxylate, an orthophthalate, a p-toluenesulfonate, a phenoxide, a phenol resin salt, a naphthoate, an octoate, an oleate, a formate, and a phenolic novolac resin salt of DBU and DBN. The DBU or DBN salt is preferably at least one compound selected from the group consisting of 1,8-benzyl-1,8-diazabicyclo(5.4.0)-7-undecenium chloride (DBU-B), a naphthoate, an orthophthalate, a phenoxide, and a formate.

Exemplary adhesion promoters include: 1,8-diazabicyclo (5.4.0)undec-7-ene; 1,8-benzyl-1,8-diazabicyclo(5.4.0)-7-undecenium chloride; 1,8-diazabicyclo(5.4.0)undec-7-ene naphthoate, 1,8-diazabicyclo(5.4.0)undec-7-ene phenoxide; 1,8-diazabicyclo(5.4.0)undec-7-ene orthophthalate; and 1,8-diazabicyclo(5.4.0)undec-7-ene formate, tridodecylamine (TDDA), trihexadecylamine (THDA), hexamethyldisilazane, tertiary amine/BF$_3$ complex, and mixtures thereof.

Other classes of adhesion promoters include strong organic bases like phosphazenes or guanidines.

In one embodiment, the second polymer layer is substantially free of an adhesion promoter, wherein substantially free means that the polymer comprises less than 0.1%, 0.05%, 0.01%, or even 0.001%.

In another embodiment, the first polymer layer may contain smectite layered clay minerals to further lower the fuel permeability. Exemplary minerals include montmorillonite, beidellite, saponite, nontronite, hectorite, sauconite, and stevensite, and/or fine layered minerals having high aspect ratio such as mica. Alternatively, the first polymer layer may be substantially free (i.e., less than 0.1%, 0.05%, 0.01%, or even 0.001%) of such materials.

With an aim of providing conductivity, in one embodiment, a conductive filler may be added to the first polymer layer as is known in the art. The conductive filler is not particularly limited, and examples thereof include a powdery or fibrous conductive elementary substance such as metals and carbons, powder of conductive compounds such as zinc oxide, and powder provided with electric conductivity by a surface treatment. Alternatively, the first polymer layer may be substantially free (i.e., less than 0.1%, 0.05%, 0.01%, or even 0.001%) of a conductive filler.

In one embodiment, the multilayer article of the present disclosure is produced by lamination of the elastomer and the fluorothermoplastic polymer. In the laminate of the present disclosure, the elastomer layer may be laminated on both faces (or just one face) of the fluorothermoplastic polymer. In one embodiment, the fluorothermoplastic polymer layer may be laminated on both faces of the elastomer layer.

Lamination of the elastomer layer and the fluorothermoplastic polymer layer may be carried out by any method such as a method of laminating the elastomer layer and the fluorothermoplastic polymer layer, which have been separately formed, by pressure bonding and the like, a method of laminating the elastomer layer and the fluorothermoplastic polymer layer by simultaneously forming the both layers, and a method of applying the fluorothermoplastic polymer layer composition to the elastomer layer.

In the method of laminating the elastomer layer and the fluorothermoplastic polymer layer, which have been separately formed, by pressure bonding and the like, different methods may be employed to form layers respectively for the fluorothermoplastic polymer and the elastomer composition for vulcanization.

Formation of the fluorothermoplastic polymer layer may be carried out by shaping the composition for vulcanization into various shapes such as a sheet and a tube by heat compression molding, transfer molding, extrusion, injection, calendering, coating, or the like.

The fluorothermoplastic polymer layer may be formed by heat compression molding, melt-extrusion, injection, coating (including powder coating), or the like. Forming may be carried out by using a common forming machine for fluoropolymers such as an injection machine, a blow molding machine, an extrusion machine, and various coating machines. With such a machine, it is possible to produce laminates having various shapes such as a sheet and a tube. Among these methods, melt-extrusion is preferable because of its excellent productivity.

In one embodiment, another polymer layer is laminated on the fluorothermoplastic polymer layer, a forming method such as multilayer extrusion, multilayer blow molding, and multilayer injection may be employed to produce multilayer molded products such as multilayer tubes, multilayer hoses, and multilayer tanks.

Examples of the method of laminating the elastomer layer and the fluorothermoplastic polymer layer by simultaneously forming the both layers include a method of performing forming and laminating at the same time the elastomer layer and the fluorothermoplastic polymer layer by a method such as multilayer compression molding, multilayer transfer molding, multilayer extrusion, multilayer injection, or doubling.

The multilayer articles of the present disclosure comprise at least one elastomer layer and at least one fluorothermoplastic polymer layer of the present disclosure. In some embodiments, the multilayer article may comprise additional polymer layer, 16.

The additional polymer layer may be a second elastomer layer, a plastic layer, or a fiber reinforcement layer. In addition, the elastomer layer and/or the fluorothermoplastic polymer layer may be further laminated by interposing additional polymer layer 16.

In one embodiment, additional polymer layer 16 is made of an elastomer other than the elastomer that is directly adhered to the fluorothermoplastic polymer layer, and the elastomer may be fluorinated or non-fluorinated (fluorine-free).

In one embodiment, additional polymer layer 16 is a plastic having excellent mechanical strength or a resin having low permeability to fuels and gas. Specific examples of the plastic having excellent mechanical strength include fluoroplastics (other than the fluorothermoplastic polymer of the present disclosure), polyamide resins, polyolefin resins, vinyl chloride resins, polyurethane resins, polyester resins, polyaramide resins, polyimide resins, polyamideimide resins, polyphenylene oxide resins, polyacetal resins, polycarbonate resins, acrylic resins, styrene resins, acrylonitrile/butadiene/styrene resins (ABS), cellulose resins, polyetheretherketone resins (PEEK), polysulfone resins, polyethersulfone resins (PES), and polyetherimide resins. Specific examples of the plastic having low permeability to fuels and gas include resins containing ethene/vinyl alcohol copolymers, polyphenylene sulfide resins, polybutylene naphthalate resins, polybutylene terephthalate resins, and polyphthalamide (PPA). Among these, polyamide resins are preferable because of their fine formability and adhesiveness. In the case where a laminate is subjected to vulcanization treatment, the melting point of the plastic is preferably higher than the temperature of the heat treatment.

Such multilayered articles disclosed here, which have good adhesion to other materials, while also having low fuel permeation, may be particularly useful in fuel applications, such as in fuel hoses. Because the fluorothermoplastic polymers of the present disclosure show chemically-firm adhesion to elastomers, special procedures for adhering are not needed, which allows easy forming at low cost. In addition, since a common forming method such as extrusion can be employed, thinner products can be produced so that the flexibility of the material is improved.

Exemplary embodiments of the present disclosure are described below:

Embodiment 1. A composition comprising a fluorothermoplastic polymer, wherein the fluorothermoplastic polymer is derived from:

(a) 60-85 mol % tetrafluoroethene;
(b) 2-12 mol % hexafluoropropene;
(c) 10-30 mol % vinylidene fluoride;
(d) 0.2 to 5 mol % of a bromine-containing monomer.

Embodiment 2. The composition according to embodiment 1, wherein the fluorothermoplastic polymer has a melting point of at least 150° C.

Embodiment 3. The composition of any one of the previous embodiments, wherein the fluorothermoplastic polymer has an MFR of 1 to 100 g/10 min at 297° C. in case of a polymer with a melting point in the range of 150-250° C. and of 1 to 100 g/10 min at 372° C. in case of a polymer with a melting point above 250° C.

Embodiment 4. The composition of any one of the previous embodiments, wherein the bromine-containing monomer is fluorinated.

Embodiment 5. The composition of any one of the previous embodiments, wherein the bromine-containing monomer is selected from $F_2C=CHBr$, $F_2C=CFBr$, $H_2C=CH-CF_2-CF_2-Br$, $H_2C=CH-CF_2-Br$, $F_2C=CF-O-(CF_2)_x-Br$, $F_2C=CF-O-CF(CF_3)-CF_2-O-(CF_2)_x-Br$, $F_2C=CF-CF_2-O-(CF_2)_x-Br$, $H_2C=CH-CH_2-Br$, $F_2C=CF-O-CF_2-CFBr-CF_3$, and combinations thereof, where x is 2, 3, 4, or 5.

Embodiment 6. The composition of any one of the previous embodiments, wherein the fluorothermoplastic polymer is further derived from 0.1 to 5 mol % of a fluorinated allyl ether monomer and/or fluorinated vinyl ether monomer.

Embodiment 7. The composition of embodiment 6, wherein the fluorinated vinyl ether monomer is selected from perfluoro(methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), $CF_3-(CF_2)_2-O-CF(CF_3)-CF_2-O-CF(CF_3)-CF_2-O-CF=CF_2$ (PPVE-3), and combinations thereof.

Embodiment 8. The composition of embodiment 6, wherein the fluorinated allyl ether monomer is selected from perfluoro(methyl allyl ether), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), $CF_3-(CF_2)_2-O-CF(CF_3)-CF_2-O-CF(CF_3)-CF_2-O-CF_2CF=CF_2$, and combinations thereof.

Embodiment 9. The composition of any one of the previous embodiments, wherein the fluorothermoplastic is further derived from a fluorinated diallyl ether, a fluorinated divinyl ether, or a fluorinated allyl vinyl ether monomer.

Embodiment 10. The composition of any one of the previous embodiments, wherein the fluorothermoplastic polymer has a permeation constant of less than 2.9 g mm/m² d when measured at 60° C. with CE10 fuel.

Embodiment 11. A multilayer article comprising:
a first polymer layer comprising the fluorothermoplastic polymer of any one of embodiments 1-10; and
a second polymer layer wherein the second polymer layer is an elastomer,
wherein the first polymer layer is intimate contact with the second polymer layer.

Embodiment 12. The multilayer article of embodiment 11, comprising an interface between the first polymer layer and the second polymer layer wherein the interface consists essentially of a first material having the composition of the first polymer layer and a second material having the composition of the second polymer layer.

Embodiment 13. The multilayer article of any one of embodiments 11-12, wherein the first polymer layer and the second polymer layer have an average peel strength of at least 4 lb/in.

Embodiment 14. The multilayer article of embodiment 11, wherein a bonding interface between the first polymer layer and the second polymer layer comprises a tie layer.

Embodiment 15. The multilayer article of any one of embodiments 11-14, wherein the elastomer is selected from an acrylonitrile-butadiene elastomer or a hydrogenated elastomer thereof, a blended elastomer of acrylonitrile-butadiene elastomer and poly(vinyl chloride), a fluorine-containing elastomer, an epichlorohydrin elastomer, an ethene-propene elastomer, a chlorosulfonated polyethene elastomer, an acrylic elastomer, and combinations thereof.

Embodiment 16. The multilayer article of any one of embodiments 11-15, wherein the second polymer layer comprises an adhesion promoter.

Embodiment 17. The multilayer article of embodiment 16, wherein the adhesion promoter is selected from: DBU, a DBU salt, DBN, a DBN salt, and mixtures thereof.

Embodiment 18. The multilayer article of any one of embodiments 11-15, wherein the second polymer layer is substantially free of an adhesion promoter.

Embodiment 19. The multilayer article of any one of embodiments 11-18, further comprising a third layer, wherein the third layer is bonded to the first polymer layer or the second polymer layer.

Embodiment 20. The multilayer article of any one of embodiments 11-19, wherein the multilayer article is a hose.

Embodiment 21. A method of making a composition comprising:
providing
(a) 60-85 mol % tetrafluoroethene monomer;
(b) 2-12 mol % hexafluoropropene monomer;
(c) 10-30 mol % vinylidene fluoride monomer; and
(d) 0.2 to 5 mol % of a bromine-containing monomer; and polymerizing the monomers in an aqueous phase in the presence of an initiator.

Embodiment 22. The method of embodiment 21, wherein the polymerization is substantially free of a fluorinated surfactant.

Embodiment 23. The method of any one of embodiments 21 or 22, wherein the polymerization is substantially free of a non-aqueous solvent.

Embodiment 24. The method of any one of embodiments 21 or 22, further comprising 0.1-5 mol % of a fluorinated allyl ether monomer and/or fluorinated vinyl ether monomer.

Embodiment 25. The method of embodiment 24, wherein the fluorinated vinyl ether monomer is selected from perfluoro(methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), $CF_3-(CF_2)_2-O-CF(CF_3)-CF_2-O-CF(CF_3)-CF_2-O-CF=CF_2$ (PPVE-3), and combinations thereof.

Embodiment 26. The method of embodiment 24, wherein the fluorinated allyl ether monomer is selected from perfluoro(methyl allyl ether), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), $CF_3-(CF_2)_2-O-CF(CF_3)-CF_2-O-CF(CF_3)-CF_2-O-CF_2CF=CF_2$, and combinations thereof.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, hr=hour, kg=kilograms, min=minute, mol=mole, ml=milliliter, L=liter, pphr=pounds per hundred rubber, and wt=weight.

Methods

MFR

The melt flow rate (MFR), reported in g/10 min, was measured following a similar procedure as described in DIN EN ISO 1133-1:2012-03 at a support weight of 5.0 kg and a temperature of 297° C. The MFR was obtained with a standardized extrusion die of 2.1 mm in diameter and a length of 8.0 mm.

Melting Point

The melting point of the fluorothermoplastic polymer was determined using differential scanning calorimetry following a similar procedure as described in ASTM D4591-07 (2012) using a PerkinElmer Pyris 1 DSC (Waltham, Mass.) under nitrogen flow with a heating rate of 10° C./min. The reported melting points relate to the melting peak maximum.

Particle Size

The latex particle size determination was conducted by means of dynamic light scattering with a Malvern Zetasizer 1000HSA (Worchestershire, UK) following a similar procedure as described in DIN ISO 13321:2004-10. The reported average particle size is the z-average. Prior to the measurements, the polymer latexes as yielded from the polymerizations were diluted with 0.001 mol/L KCl-solution. The measurement temperature was 20° C. in all cases.

Permeation Constant

Sample Preparation:

Films for permeation testing of CE A and Ex 1-2 were prepared by skiving in the following manner. Approximately 300-350 g of the fluoropolymer agglomerate were melted in an oven set at 300° C. for 2 hours. When the agglomerate was completely melted, it was poured into a mold. The mold was placed in a press set at room temperature, and a staged pressing cycle was employed, 30 minutes at 250 bar, 20 minutes at 150 bar and 10 minutes at 10 bar. The mold was allowed to cool to room temperature overnight. The resultant pressed block with a diameter of 4.5 cm and approximately a height of 10 cm was then skived on a lathe set with a blade to achieve the desired thickness. Skived films of 250 µm thickness were thus produced.

Film for permeation testing of CE B was produced by conventional extrusion methods. The extrusion set-up comprised a 30 mm single screw (screw length 750 mm) extruder (available from Collin GmbH, Ebersberg, Germany) equipped with a 320 mm width film die (available from Breyer GmbH, Singen, Germany) and a 3-roll calender (available from Collin GmbH, Ebersberg, Germany). The temperature profile in the extruder was 250° C., 270° C., 275° C., 275° C. from Zone 1 to Zone 4 respectively. The temperature of the flange was 285° C., and the die and lip were both 280° C. A filter pack of 1000/500/200 µm was employed. Film was extruded at a screw speed of 18 rpm, and the 3-roll stack temperature was maintained at 120° C. with a separation between the die and 3-roll stack of 80 mm. Film of 260 mm width and 250 µm thickness was produced at a line speed of approximately 0.4 m/min.

Film for permeation testing of CE C was produced similar to CE B with the exception that a 30 mm Ide single screw extruder (available from Bernhard Ide GmbH & Co. KG, Ostfildern, Germany) was used. The temperature profile in the extruder was 210° C., 240° C., 245° C., 245° C. from Zone 1 to Zone 4 respectively. The temperature for both the flange and die was 250° C. and 260° C. for the lip. The 3-roll stack temperature was maintained at 100° C. with a separation between the die and 3-roll stack of 70 mm. Film of 260 mm width and 250-280 µm thickness was produced at a line speed of approximately 0.6 m/min.

Permeation Testing:

Permeation constants were determined in accordance to SAE J2665 Test Procedure to Measure the Fuel Permeability of Materials by the Cup Weight Loss Method issued October 2006 with the following changes and details. Perfluoroelastomer gaskets were used and made by conventional methods from the following compound:

100 pphr perfluoroelastomer (available under the trade designation "3M DYNEON PFE 90Z", from 3M Co., St. Paul, Minn.)

15 pphr N990 MT carbon black (available under the trade designation "THERMAX N990" from Cancarb, Canada)

5 pphr Zinc Oxide USP-1 (available from HallStar, Chicago, Ill.)

1.5 pphr peroxide (available under the trade designation "VAROX DBPH-50" available from Vanderbilt Chemicals Corp., Murray, Ky.)

2.5 pphr co-agent (available under the trade designation "TAIC DLC-A", 72% active available from Harwick Standard Distribution Corp., Itasca, Ill.)

The test fluid was 100 ml of Fuel CE10 (10% ethanol, 45% iso-octane, 45% toluene by volume). The test temperature was 60° C. The result(s) for each sample are reported.

Peel Strength

Sample Preparation:

Nitrile rubber compound was prepared by conventional methods with a two-roll mill by compounding the following 100 pphr butadiene-acrylonitrile copolymer (available under the trade designation "NIPOL DN3350" from Zeon Chemicals, Louisville, Ky.)

60 pphr N-762 carbon black (available from Cabot Corp., Billerica, Mass.)

3.5 pphr dicumyl peroxide (available under the trade designation "DI-CUP 40KE" from GEO Specialty Chemicals)

5 pphr calcium hydroxide (available from The C.P. Hall Company)

5 pphr calcium oxide (available from HallStar)

2 pphr stearic acid (available from Aldrich)

5 pphr dioctyl phthalate (available from Aldrich)

1 pphr 1,8-Diazabicyclo[5.4.0]undec-7-ene (DBU, available from Spectrum Chemicals-TCI)

A sheet about 3.5 mm thick was formed from the nitrile rubber compound by using the two-roll mill.

Films for peel testing of CE A and Ex 1-2 were made by placing approximately 6 g of each agglomerate between polyimide sheets. These sheets were then placed in a Vogt vacuum press (Berlin, Germany) set at 270° C. Vacuum was started and for the first 60 seconds no pressure was applied, in the next 30 seconds 2-5 bar pressure was applied, in the last 30 seconds a pressure between 15-20 bars was applied. The sheets were removed from the press and allowed to air cool. In this manner, depending on the MFR of the fluoropolymer, plaques with a diameter between 10-15 cm with a thickness of 150-300 µm were produced.

For Comparative Examples B and C, extruded films used for permeation testing were also used for peel strength testing.

To make the nitrile rubber-fluoropolymer laminates for peel testing, sections approximately 2.5 cm×7.5 cm were cut from the nitrile sheet. Sections approximately 2.5 cm×7.5 cm were also cut from the fluoropolymer film. Laminates were molded using a frame mold with 2.5 cm×7.5 cm×0.35 cm cavities preheated to 177° C. Laminates made using CE C were molded at 160° C. due to the lower melting temperature of CE C. The mold was placed on a sheet of polyester release film. One section of fluoropolymer film was placed in the bottom of each mold cavity, a 2.5 cm×2.5 cm piece of polyester release film was placed over one end of each fluoropolymer film to create a tab for peel testing, and then one nitrile rubber section was placed into each mold cavity over the fluoropolymer film. Another sheet of polyester release film was placed over the mold. The mold was placed into the preheated hydraulic press and held under 24 bars pressure for 60 minutes. The mold was removed from the press, allowed to cool to room temperature and then disassembled. The polyester film did not adhere to the fluorothermoplastic polymer or the NBR compound and could be removed easily. The polyester release tabs were also removed prior to peel testing.

Peel strength of the fluorothermoplastic-NBR laminated samples were measured via a T-peel test in accordance to ASTM D-1876-08 using an Instron Model 5564 test machine with a crosshead speed of 300 mm/min. The result(s) for each sample are reported. Unless otherwise noted, the mode of failure is adhesion failure between the layers. If the tab of the laminate held by the grip of the test machine broke during the test without any separation between the layers, the peak load was used to calculate the peel strength and is noted in table.

Comparative Example A (CE A)

A copolymer of TFE, HFP, VDF, PPVE-1, and BTFB was prepared as follows:

A polymerization kettle with a total volume of 50 L equipped with an impeller agitator system was charged with 27 L deionized water, 2 g oxalic acid, 12 g ammonium oxalate, and 270 g of a 30 mass % aqueous solution of ammonium 4,8-dioxa-3-H-perfluorononanoate ($CF_3$—O—$(CF_2)_3$—O—CFH—$CF_2$—$COONH_4$, prepared as in "Preparation of Compound 11" in U.S. Pat. No. 7,671,112). The oxygen-free kettle was then heated up to 60° C. and the agitation system was set to 240 rpm. The kettle was charged with 0.54 bar ethane, 17 g PPVE-1, and 1.4 kg hexafluoropropene (HFP) to a pressure of 10.2 bar absolute, with 50 g vinylidene difluoride (VDF) to 11.0 bar absolute and with 425 g tetrafluoroethene (TFE) to 17.0 bar absolute reaction pressure. The polymerization was initiated by the addition of 29 g of a 1.0% aqueous potassium permanganate ($KMnO_4$) solution and a continuous feed of $KMnO_4$-solution was maintained with a feed rate of 72 g/hr. As the reaction starts, the reaction temperature of 60° C. was maintained and the reaction pressure of 17.0 bar absolute was maintained by feeding TFE, VDF, HFP, PPVE-1, and BTFB into the gas phase with monomer mole fractions of $x_{TFE}$=0.785, $x_{VDF}$=0.152, $x_{HFP}$=0.045, $x_{PPVE-1}$=0.015, and $x_{BTFB}$=0.003.

When a total feed of 14.2 kg TFE was reached in 400 min, the feed of the monomers was interrupted by closing the monomer valves. Then the reactor was vented and flushed with $N_2$ in three cycles.

The so-obtained 47.3 kg polymer dispersion, having a solid content of 38.1 mass % and latex particles with 83 nm in diameter according to dynamic light scattering, was removed at the bottom of the reactor. The dispersion was stirred in presence of Dowex Monosphere 650C cation exchange resin (Dow Chemical Co., Midland, Mich.) followed by removal of the cation exchange resin from the dispersion. The dispersion was subsequently coagulated, agglomerated, and dried for 16 hr at 120° C. to give 18.0 kg dry polymer. The physical properties of the polymer are shown in Table 1 below.

Example 1 (Ex 1)

A copolymer was prepared in the same manner as in CE A except that the kettle was charged with 0.63 bar ethane and that the monomer feed mole fractions were adjusted to $x_{TFE}$=0.785, $x_{VDF}$=0.152, $x_{HFP}$=0.043, $x_{PPVE-1}$=0.015, and $x_{BTFB}$=0.005. The supply of monomers was interrupted after feeding 12.3 kg TFE in 390 min. 44.8 kg of a polymer dispersion was obtained with a solid content of 34.9 mass % (15.6 kg of dry polymer) and latex particles with 72 nm in diameter. The physical properties of the polymer are shown in Table 1 below.

Example 2 (Ex 2)

A copolymer was prepared in the same manner as in Example 1 except that the kettle was charged with 0.63 bar ethane and that the monomer feed mole fractions were adjusted to $x_{TFE}$=0.785, $x_{VDF}$=0.152, $x_{HFP}$=0.038, $x_{PPVE-1}$=0.015, and $x_{BTFB}$=0.010. The supply of monomers was interrupted after feeding 8.5 kg TFE in 360 min. 39.5 kg polymer dispersion were obtained with a solid content of 27.4 mass % (10.8 kg of dry polymer) and latex particles with 65 nm in diameter. The physical properties of the polymer are shown in Table 1 below.

Example 3 (Ex 3)

A copolymer of TFE, HFP, VDF, and BDFE was prepared as follows:

A polymerization kettle with a total volume of 50 L equipped with an impeller agitator system was charged with 27 L deionized water, 2 g oxalic acid, 12 g ammonium oxalate, and 270 g of a 30 mass % aqueous solution of ammonium 4,8-dioxa-3-H-perfluorononanoate ($CF_3$—O—$(CF_2)_3$—O—CFH—$CF_2$—$COONH_4$, prepared as in "Preparation of Compound 11" in U.S. Pat. No. 7,671,112). The oxygen-free kettle was then heated up to 60° C. and the agitation system was set to 240 rpm. The kettle was charged with 0.82 bar ethane and 1.4 kg hexafluoropropene (HFP) to a pressure of 10.0 bar absolute, with 150 g vinylidene difluoride (VDF) to 12.2 bar absolute and with 525 g tetrafluoroethene (TFE) to 17.0 bar absolute reaction pressure. The polymerization was initiated by the addition of 54 mL of a 0.6% aqueous potassium permanganate ($KMnO_4$) solution and a continuous feed of $KMnO_4$-solution was maintained with a feed rate of 120 mL/hr. As the reaction starts, the reaction temperature of 60° C. was maintained and the reaction pressure of 17.0 bar absolute was maintained by feeding TFE, VDF, HFP, and BDFE into the gas phase with monomer mole fractions of $x_{TFE}$=0.601, $x_{VDF}$=0.289, $x_{HFP}$=0.108, and $x_{BDFE}$=0.002.

When a total feed of 8.7 kg TFE was reached in 340 min, the feed of the monomers was interrupted by closing the monomer valves. Then the reactor was vented and flushed with $N_2$ in three cycles.

The so-obtained 40.8 kg polymer dispersion, having a solid content of 33.8 mass % and latex particles with 92 nm in diameter according to dynamic light scattering, was removed at the bottom of the reactor. The dispersion was stirred in presence of Dowex Monosphere 650C cation exchange resin (Dow Chemical Co., Midland, Mich.) followed by removal of the cation exchange resin from the dispersion. The dispersion was subsequently coagulated, agglomerated and dried for 16 hr at 120° C. to give 13.8 kg dry polymer. The physical properties of the polymer are shown in Table 1 below.

Comparative Example B (CE B)

A copolymer of TFE, HFP, VDF, and PPVE-1 was prepared as follows:

A polymerization kettle with a total volume of 50 L equipped with an impeller agitator system was charged with 28 L deionized water, 2 g oxalic acid, 12 g ammonium oxalate, and 210 g of a 30 mass % aqueous solution of ammonium 4,8-dioxa-3—H-perfluorononanoate. The oxygen-free kettle was then heated up to 60° C. and the agitation system was set to 240 rpm. The kettle was charged with 0.36 bar ethane, with PPVE-1 to a pressure of 1.14 bar absolute, with HFP to a pressure of 8.5 bar absolute, with VDF to 9.8 bar absolute and with TFE to 15.5 bar absolute reaction pressure. The polymerization was initiated by the addition of 9 ml of a 2.6% aqueous potassium permanganate ($KMnO_4$) solution and a continuous feed of $KMnO_4$-solution was maintained with a feed rate of 28 mL/hr. As the reaction starts, the reaction temperature of 60° C. was maintained and the reaction pressure of 15.5 bar absolute was maintained by feeding TFE, VDF, HFP, and PPVE-1 into the gas phase with monomer feed mole fractions of $x_{TFE}=0.724$, $x_{VDF}=0.192$, $x_{HFP}=0.069$, and $x_{PPVE-1}=0.015$.

When a total feed of 10.4 kg TFE was reached in 278 min, the feed of the monomers was interrupted by closing the monomer valves. Within 10 min, the monomer gas phase was reacted down to a kettle pressure of 10.9 bar. Then the reactor was vented and flushed with $N_2$ in three cycles.

The so-obtained 41.7 kg polymer dispersion, having a solid content of 34.1 mass % and latex particles with 98 nm in diameter according to dynamic light scattering, was removed at the bottom of the reactor. The dispersion was stirred in presence of Dowex Monosphere 650C cation exchange resin followed by removal of the cation exchange resin from the dispersion. The dispersion was subsequently coagulated, agglomerated and dried for 16 hr at 120° C. to give 14.2 kg dry polymer. The physical properties of the polymer are shown in Table 1 below.

Comparative Example C (CE C)

A copolymer of TFE, HFP, VDF, and BTFB was prepared as follows:

A polymerization kettle with a total volume of 50 l equipped with an impeller agitator system was charged with 28 L deionized water, 2 g oxalic acid, 12 g ammonium oxalate, and 270 g of a 30 mass % aqueous solution of ammonium 4,8-dioxa-3-H-perfluorononanoate. The oxygen-free kettle was then heated up to 60° C. and the agitation system was set to 240 rpm. The kettle was charged with 0.68 bar ethane, 1.1 kg HFP to a pressure of 9.9 bar absolute, with 85 g VDF to 11.5 bar absolute and with 405 g TFE to 16.0 bar absolute reaction pressure. The polymerization was initiated by the addition of 33 ml of a 1.0% aqueous potassium permanganate ($KMnO_4$) solution and a continuous feed of $KMnO_4$-solution was maintained with a feed rate of 73 mL/hr. As the reaction starts, the reaction temperature of 60° C. was maintained and the reaction pressure of 16.0 bar absolute was maintained by feeding TFE, VDF, HFP, and BTFB into the gas phase with monomer feed mole fractions of $x_{TFE}=0.555$, $x_{VDF}=0.323$, $x_{HFP}=0.119$, and $x_{BTFB}=0.003$.

When a total feed of 8.7 kg TFE was reached in 330 min, the feed of the monomers was interrupted by closing the monomer valves. Within 10 min, the monomer gas phase was reacted down to a kettle pressure of 11.2 bar. Then the reactor was vented and flushed with $N_2$ in three cycles.

The so-obtained 44.2 kg polymer dispersion, having a solid content of 33.6 mass % and latex particles with 94 nm in diameter according to dynamic light scattering, was removed at the bottom of the reactor. The dispersion was stirred in presence of Dowex Monosphere 650C cation exchange resin followed by removal of the cation exchange resin from the dispersion. The dispersion was subsequently coagulated, agglomerated and dried for 16 hr at 120° C. to give 14.8 kg dry polymer. The physical properties of the polymer are shown in Table 1 below.

The fluorothermoplastic polymers from Examples 1-3 and Comparative Examples A-C were tested for peel strength of NBR-Fluorothermoplastic polymer laminates using the method disclosed above. The results from each trial are reported in Table 1.

TABLE 1

|  | CE A | Ex 1 | Ex 2 | Ex 3 | CE B | CE C |
|---|---|---|---|---|---|---|
| Melting point (maximum)/° C. | 242 | 242 | 237 | 191 | 224 | 165 |
| MFR (297° C./5 kg)/ (g/10 min) | 5.7 | 3.8 | 0.8 | 32 | 28 | 15.5 |
| permeation constant (60° C., CE10 fuel)/ (g · mm · d$^{-1}$ · m$^{-2}$) | 1.4 | NT | 1.7 | NT | 2.9 | NT |
| Peel test (lbs/in) | 3, 3 | 4, 4, 6 | 11, 6, 34* | NT | 21*, 22* | 20* |

NT is not tested
*denotes tab failure without layer separation during testing

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A composition comprising a fluorothermoplastic polymer, wherein the fluorothermoplastic polymer is derived from:
   (a) 60-85 mol % tetrafluoroethene;
   (b) 2-12 mol % hexafluoropropene;
   (c) 10-30 mol % vinylidene fluoride; and
   (d) 0.2 to 5 mol % of a bromine-containing monomer, wherein the fluorothermoplastic polymer has a melting point of at least 150° C.

2. The composition of claim 1, wherein the fluorothermoplastic polymer has an MFR of 1 to 100 g/10 min at 297° C. in case of a polymer with a melting point in the range of 150-250° C. and of 1 to 100 g/10 min at 372° C. in case of a polymer with a melting point above 250° C.

3. The composition of claim 1, wherein the bromine-containing monomer is fluorinated.

4. The composition of claim 1, wherein the bromine-containing monomer is selected from $F_2C$=CHBr, $F_2C$=CFBr, $H_2C$=CH—$CF_2$—$CF_2$—Br, $H_2C$=CH—$CF_2$—Br, $F_2C$=CF—O—$(CF_2)_x$—Br, $F_2C$=CF—O—CF($CF_3$)—$CF_2$—O—$(CF_2)_x$—Br, $F_2C$=CF—$CF_2$—O—$(CF_2)_x$—Br, $H_2C$=CH—$CH_2$—Br, $F_2C$=CF—O—$CF_2$—CFBr—$CF_3$, and combinations thereof, where x is 2, 3, 4, or 5.

5. The composition of claim 1, wherein the fluorothermoplastic polymer is further derived from 0.1 to 5 mol % of a fluorinated allyl ether monomer and/or fluorinated vinyl ether monomer.

6. The composition of claim 1, wherein the fluorothermoplastic is further derived from a fluorinated diallyl ether, a fluorinated divinyl ether, or a fluorinated allyl vinyl ether monomer.

7. The composition of claim 1, wherein the fluorothermoplastic polymer has a permeation constant of less than 2.9 g mm/m$^2$ d when measured at 60° C. with CE10 fuel.

8. A multilayer article comprising:
   a first polymer layer comprising the fluorothermoplastic polymer of claim 1; and
   a second polymer layer wherein the second polymer layer is an elastomer,
   wherein the first polymer layer is intimate contact with the second polymer layer.

9. The multilayer article of claim 8, comprising an interface between the first polymer layer and the second polymer layer wherein the interface consists essentially of a first material having the composition of the first polymer layer and a second material having the composition of the second polymer layer.

10. The multilayer article of claim 8, wherein the first polymer layer and the second polymer layer have an average peel strength of at least 4 lb/in.

11. The multilayer article of claim 8, wherein the elastomer is selected from an acrylonitrile-butadiene elastomer or a hydrogenated elastomer thereof, a blended elastomer of acrylonitrile-butadiene elastomer and poly(vinyl chloride), a fluorine-containing elastomer, an epichlorohydrin elastomer, an ethene-propene elastomer, a chlorosulfonated polyethene elastomer, an acrylic elastomer, and combinations thereof.

12. The multilayer article of claim 8, further comprising a third layer, wherein the third layer is bonded to the first polymer layer or the second polymer layer.

13. The multilayer article of claim 8, wherein the multilayer article is a hose.

14. A method of making a composition comprising:
providing
(a) 60-85 mol % tetrafluoroethene monomer;
(b) 2-12 mol % hexafluoropropene monomer;
(c) 10-30 mol % vinylidene fluoride monomer; and
(d) 0.2 to 5 mol % of a bromine-containing monomer; and
polymerizing the monomers in an aqueous phase in the presence of an initiator.

15. The composition of claim 5, wherein the fluorinated vinyl ether monomer is selected from perfluoro(methyl vinyl ether) (PMVE), perfluoro(ethyl vinyl ether) (PEVE), perfluoro(n-propyl vinyl ether) (PPVE-1), perfluoro(2-propoxypropyl vinyl ether) (PPVE-2), perfluoro(3-methoxy-n-propyl vinyl ether), perfluoro(2-methoxyethyl vinyl ether), CF3-(CF2)2-O—CF(CF3)-CF2-O—CF(CF3)-CF2-OCF=CF2(PPVE-3), and combinations thereof.

16. The composition of claim 5, wherein the fluorinated allyl ether monomer is selected from perfluoro(methyl allyl ether), perfluoro(ethyl allyl ether), perfluoro(n-propyl allyl ether), perfluoro(2-propoxypropyl allyl ether), perfluoro(3-methoxy-n-propyl allyl ether), perfluoro(2-methoxyethyl allyl ether), CF3-(CF2)2-OCF(CF3)-CF2-O—CF(CF3)-CF2-O—CF2CF=CF2, and combinations thereof.

17. The multilayer article of claim 8, wherein the second polymer layer comprises an adhesion promoter.

18. The multilayer article of claim 17, wherein the adhesion promoter is selected from: DBU, a DBU salt, DBN, a DBN salt, and mixtures thereof.

19. The multilayer article of claim 8, wherein the second polymer layer is substantially free of an adhesion promoter.

20. The multilayer article of claim 8, wherein the multilayer article is a hose.

* * * * *

UNITED STATES PATENT AND TRADEMARK OFFICE
CERTIFICATE OF CORRECTION

PATENT NO. : 10,087,322 B2
APPLICATION NO. : 15/503109
DATED : October 2, 2018
INVENTOR(S) : Lisa Chen Page 1 of 1

It is certified that error appears in the above-identified patent and that said Letters Patent is hereby corrected as shown below:

Column 5,
Line 5, delete "$(CF_2)COOH$," and insert -- $(CF_2)_5COOH$, --, therefor.
Line 22, delete "—[O—" and insert -- —[O—$(CX_2)_r]_s$—[O— --, therefor.
Line 42, delete "—$CF_2)^t$—" and insert -- —$CF_2)_t$— --, therefor.

Column 8,
Line 47, delete "$CF=CF_1CF_2$" and insert -- $CF=CF_2$, $CF_2$ --, therefor.

Column 11,
Line 51, delete "layer," and insert -- layer; --, therefor.
Line 51, delete "layer, or" and insert -- layer; or --, therefor.

Column 15,
Line 40, delete "Ostfildem," and insert -- Ostfildern, --, therefor.

Signed and Sealed this
Twenty-seventh Day of November, 2018

Andrei Iancu
*Director of the United States Patent and Trademark Office*